(12) United States Patent
Zheng et al.

(10) Patent No.: US 10,103,941 B2
(45) Date of Patent: Oct. 16, 2018

(54) NODES OF WIRELESS NETWORK AND STATUS UPDATING METHOD THEREOF

(71) Applicant: Telink Semiconductor (Shanghai) Co., LTD., Shanghai (CN)

(72) Inventors: Mingjian Zheng, Shanghai (CN); Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 152 days.

(21) Appl. No.: 15/089,901

(22) Filed: Apr. 4, 2016

(65) Prior Publication Data

US 2017/0163477 A1 Jun. 8, 2017

(30) Foreign Application Priority Data

Dec. 3, 2015 (CN) .......................... 2015 1 0883721

(51) Int. Cl.
| | |
|---|---|
| *H04L 12/24* | (2006.01) |
| *G06F 15/16* | (2006.01) |
| *H04L 12/28* | (2006.01) |

(52) U.S. Cl.
CPC ........ *H04L 41/082* (2013.01); *H04L 12/2803* (2013.01); *H04L 41/085* (2013.01); *Y02P 90/02* (2015.11)

(58) Field of Classification Search
None
See application file for complete search history.

(56) References Cited

U.S. PATENT DOCUMENTS

| | | | | |
|---|---|---|---|---|
| 2009/0316624 | A1* | 12/2009 | Van Der Wateren | H04L 12/417 370/328 |
| 2012/0143957 | A1* | 6/2012 | Ganapathy | H04L 43/0817 709/205 |
| 2014/0233460 | A1* | 8/2014 | Pettus | H04Q 1/15 370/328 |
| 2016/0219117 | A1* | 7/2016 | Marlatt | G06F 9/5027 |

* cited by examiner

*Primary Examiner* — Natisha D Cox
(74) *Attorney, Agent, or Firm* — Nixon & Vanderhye P.C.

(57) ABSTRACT

The present invention relates to the smart home field and discloses a node of a wireless network and a status updating method thereof. In the present invention, each node in the wireless network periodically sends status broadcast message according to the preset period, and the status broadcast message at least carries the identifier and current status information of the present node. The nodes receiving the status broadcast messages record the current status information of the other nodes carried in the received status broadcast messages, wherein the recorded current status information of the other nodes is carried in the sent status broadcast message if the each node in the wireless network has received the status broadcast message of the other nodes when needing to send the status broadcast message. In the present invention, the nodes in wireless network can periodically send status broadcast message carrying the received current status information of the other nodes, such that it can automatically update status of the device nodes in the smart home system and improve the user experience.

9 Claims, 1 Drawing Sheet

NODES OF WIRELESS NETWORK AND STATUS UPDATING METHOD THEREOF

CROSS REFERENCE TO RELATED APPLICATION

This application claims the benefit of Chinese Application No. 201510883721.6, filed Dec. 3, 2015, which is incorporated herein by reference in its entirety.

TECHNICAL FIELD

The present invention relates to the smart home field, and particularly relates to a status updating method for nodes of a smart home wireless network.

BACKGROUND

With the fast development of the mobile smart terminals, the home devices are also becoming more and more intelligence. The smart home system, using a residence as its platform, utilizes the generic cabling technology, network communications technology, security technology, automatic control technology and audio-video technology or the like to integrate the home life-related facilities and construct the high-efficiency management system for the residential facilities and the family matters so as to improve home safety, convenience, comfortableness and artistry and achieve an environmental protection and energy-saving living environment.

At present, the control for the smart home devices within the smart home system universally utilizes the control mode of central controller (or home gateway), i.e., the central controller is controlled by a control terminal, and the smart home devices are controlled by the central controller executing the commands from the control terminal. The inventor of the present invention finds out that, although the status information of the nodes of the wireless network can be obtained through the wireless Mesh network, it requires the user to actively initiate an inquiry, which is continuously forwarded by the intermediate nodes until the target node responds after receiving the inquiry. It will take a long time to do that and the status of the target nodes can't be obtained simultaneously, which leads to a bad user experience.

SUMMARY

The objects of the present invention are to propose nodes of a wireless network and a status updating method thereof, which allows the device nodes in the smart home system to auto-update their status and greatly improves the user experience.

In order to solve the above-mentioned technical problems, the present invention proposes a status updating method for nodes of a wireless network, and it comprises the following steps:

each node in the wireless network periodically sending the status broadcast messages according to the preset period, the status broadcast messages at least carrying the identifier and current status information of the present node;

the nodes that receive the the status broadcast messages recording the current status information of the other nodes carried in the received status broadcast messages;

wherein the recorded current status information of the other nodes are carried in the sending status broadcast messages if the each node in the wireless network has received the status broadcast messages of the other nodes when needing to send the status broadcast messages.

The present invention also proposes a node of the wireless network, comprising:

a sending module for periodically sending the status broadcast messages according to the preset cycle, the status broadcast messages at least carrying the identifier and the current status information of the present node;

a receiving module for receiving the status broadcast messages of the other nodes in the same wireless network;

a recording module for recording the current status information of the other nodes carried in the received status broadcast message when receiving the status broadcast messages of the other nodes;

a status broadcast message generation module for generating the status broadcast message to be sent currently, the generated status broadcast message carrying the recorded current status information of the other nodes.

Compared to prior art, in the present invention, the nodes of the wireless network can periodically send status broadcast messages carrying the received current status information of the other nodes, which allow the devices nodes in the smart home system to automatically update their status. Each device records the updating status of all the nodes of the wireless smart network so as to enable the user to nearby and rapidly obtain the updated status of each device without waiting a long time for the response and improve the user experiences.

In addition, the status broadcast message also carries serial number of the status broadcast message, which is convenient for the nodes of the wireless network to clearly record the current status information of the other nodes and to make the recorded status information of each node more accurate and reliable.

In addition, in the step of carrying the recorded current status information of the other nodes in the sent status broadcast message, it comprises the following sub-steps: judging whether the status broadcast message to be sent currently is able to carry the recorded current status information of all the nodes; selecting the recorded current information status of some nodes according to the preset strategy as the current status information of the other nodes carried in the status broadcast message to be sent currently if the judging result is no, wherein the preset strategy is to select the recorded current status information of the nodes according to the recording time of the current status information of the nodes and in a time order from old to new. This ensures that the status broadcast message sent each time won't be too long so as to save the resources and improve the operation efficiency of the device.

In addition, after the step of the nodes, which receive the status broadcast message, recording the current status information of the other nodes carried in the received status broadcast message, it further comprises the following steps: updating the recorded current status information of each node according to the newly received status broadcast message; marking the node corresponding to the invalid node status information as the off-line status if there is the invalid node status information in the recorded current status information of each node; wherein the invalid node status information is the current status information of the node, whose most recent updating time or recording time has a difference from the current time greater than a preset time duration threshold. This enables the user to timely and actively know the malfunctioning nodes so as to deal with the malfunction timely and furthermore improve the user experience.

DETAILED DESCRIPTION

In order to make the purpose, technical solution and advantages of the present invention more clear, the various embodiments of the present invention will be stated in detail together with the drawings. However, it will be apparent to those of ordinary skill in the art that many technical details are proposed in the various embodiments of the present invention for the purpose of better understanding of the present application. However the technical solution protected by the claims can also be realized even without these technical details and various changes and modifications based on the following various embodiments.

Figure 1:
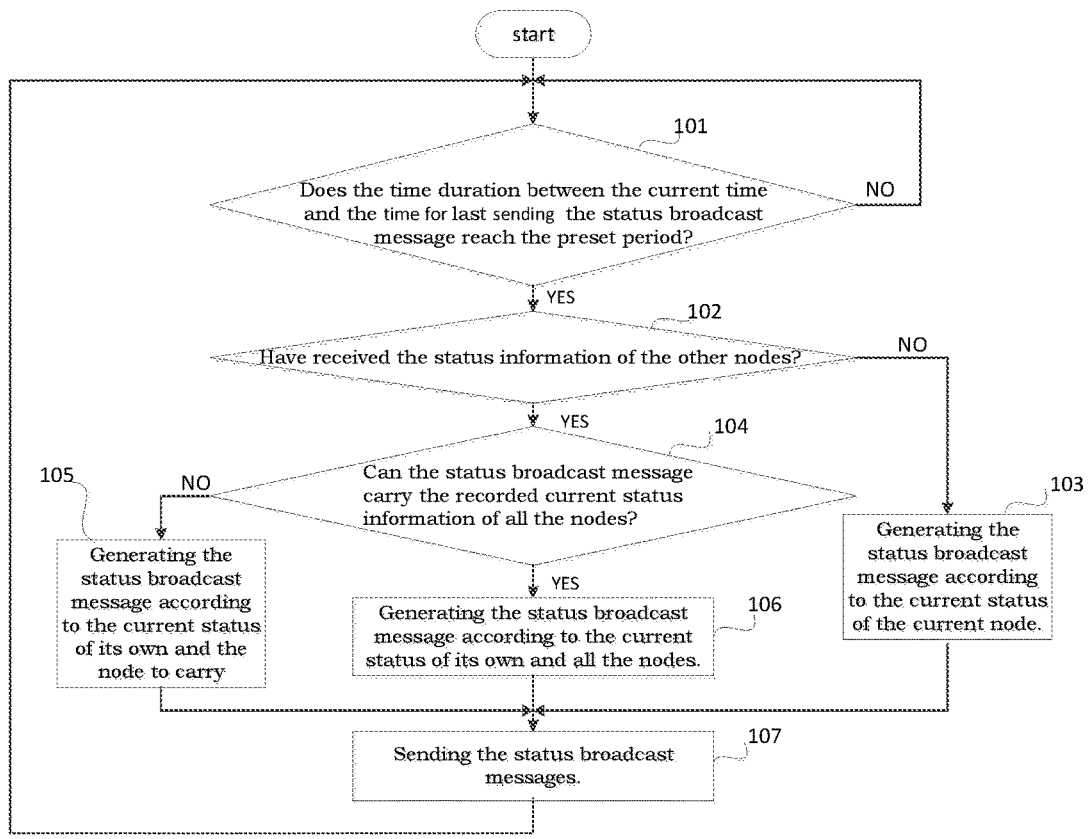
FIG. 1 is a flow diagram of a status updating method for nodes of a wireless network according to the first embodiment of the present invention.

The first embodiment of the present invention relates to status updating method for nodes of a wireless network. Wherein the nodes are the smart home devices, and the wireless network comprises any of the following type of smart home device or the composition thereof: a sensor and a smart light. The specific process is illustrated in FIG. 1.

In step 101, the nodes of the wireless network judges whether the time duration between the current time and the time sending the status broadcast message last time reaches the preset cycle. It will continue to execute step 102 if the result is yes, and it will return to wait for the next inquiry if the result is no.

In the present embodiment, the nodes of the wireless network periodically send the status broadcast message every preset cycle. The sent status broadcast message should at least carry the identifier and the current status information of the present node as well as the serial number of the present status broadcast message. In particular, the current status information of the present node can be on, off as well as the information related to its properties, such as the brightness and color for a light, the temperature for a temperature sensor, and the humidity for a humidity sensor, etc.

After acquiring the current time, the nodes of wireless network compare the difference between the current time and the time sending the status broadcast message last time to the preset cycle (e.g., 5 seconds). It will return to wait if the difference is less than 5 seconds and it will continue to execute step 102 if the difference reaches 5 seconds.

In step 102, the nodes of the wireless network judge whether it has received the status information of the other nodes. It will execute step 103 if the result is no and it will execute step 104 if the result is yes.

In the present embodiment, each node of the wireless network periodically sends the status broadcast message at least containing its own status information. Moreover, the recorded current status information of the other nodes will be carried in the sent status broadcast message if each node in the wireless network has received the status broadcast message from the other nodes when needing to send the status broadcast message. Therefore, each node can establish a status list for maintaining the status of each node of the network, as shown in table 1. Its content at least comprises its own identifier, the information recording time as well as the corresponding status information. After receiving the status messages of the other nodes, it will record the identifier, the information recording time as well as the corresponding status information of the other nodes, and the table will be constantly maintained and updated.

TABLE 1

| Identifier | Information recording time | On/Off | Property information |
|---|---|---|---|
| D1 | T1 | Off | |
| D2 | | | |
| D3 | | | |
| ... | | | |

Figure 2:
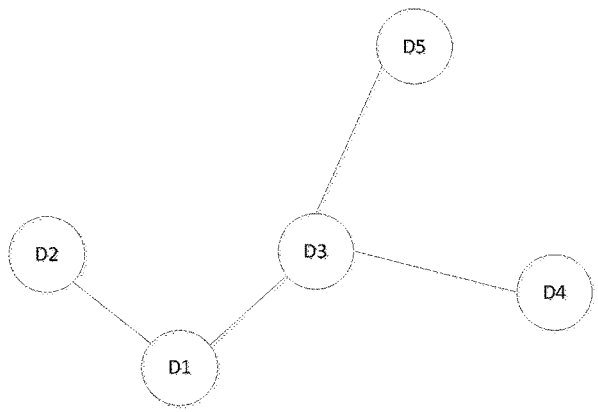
FIG. 2 is a distribution diagram of the nodes of the wireless network according to the first embodiment of the present invention.

For example, it is assuming that the wireless network comprises nodes D1, D2, D3, D4, D5, wherein D1 is in the broadcast coverage area of D2 and D3, and D3 is in the broadcast coverage area of D4 and D5, as shown in FIG. 2. For example, as for D1, at the time T1, the status list of D1 only records its own status information. And D1 has not received the status information of the other nodes up to the time T1. Therefore D1 can judge whether or not it has received the status information of the other nodes through the node status list.

In step 103, the node generates the status broadcast message according to the current status of the present node. In particular, because the node of the wireless network hasn't received the information of the other nodes when needing to send the updated status information, the status broadcast message only needs to carry the identifier, the current status information of the present node as well as the serial number of the present status broadcast message.

In step 104, the node judges whether the status broadcast message is able to carry the recorded current status information of all the nodes. The nodes of the wireless network has received the information of the other nodes when needing to send the updated status information, and needs to judge whether the status broadcast message to be sent is able to carry the recorded the current status information of all the nodes. It will execute step 106 if the result is yes, and it will execute step 105 if the result is no.

In the present embodiment, in order to the save resources, one can apply some limitations to the length of the status broadcast message, for example, defining the status broadcast message as the signaling message below 10 bytes. Therefore the nodes in the wireless network, when needing to send the updated status information, needs to judge whether the status broadcast message to be sent currently is able to carry the recorded current status information of all the nodes. It will execute step 106 if the result is yes, and it will execute step 105 if the result is no.

In step 105, the node generates the status broadcast message according to its own current status and the current status of nodes that can be carried. Because the status broadcast message has some limitations on the length, the status broadcast message to be sent possibly can't carry the recorded current status information of all the nodes if the information to be broadcasted is relatively plenty. It is needed to, according to the preset strategy, select the recorded current status information of some nodes as the current status information of the other nodes carried in the status broadcast message to be sent currently. That is, the information will be separated by the nodes and will be broadcasted in a number of broadcast cycles. The status updating can be sent out completely after a number of cycles, wherein the preset strategy is the selectively recorded current status information of the nodes according to the recording time of the current status information of the nodes and in a time order from old to new.

In particular, the nodes of the wireless network sort the recorded current status information of all the nodes according to the recording time of current status information of nodes. Then, according to a time order from old to new, it firstly needs to record the status information of the nodes whose recording time is most early compared to the current time and who are not sent still, and so on. The length of the status broadcast information is selected and allows the current status information of nodes as much as in the range as the current status information of the other nodes carried in the status broadcast message to be sent currently. For the current status information of the nodes that can't be sent for this time, it may be sent on the next broadcast.

In view of the above-mentioned examples, it is assuming that the list of D3 has contained the status information of D4 and D5 at the time T3. Then the status broadcast messages sent by D3 at this time should carry the status information of D3, D4 and D5. Because D3 is within the broadcast coverage area of D1, after receiving the status broadcast messages carrying the status information of D3, D4 and D5 by D1, before the next status broadcast message sending by D1, before also receiving the status broadcast message of D2 by D1, D1 can't carry the status information of all the nodes (D1, D2, D3, D4 and D5) due to the length limitation of the status broadcast message. Therefore it will send the firstly received status information of D3, D4 and D5 (assuming that one broadcast is able to carry the status information of the three other nodes) according to the recorded time order. And the status information of D2 will be carried in the next status broadcast message. It will select any two nodes among D3, D4 and D5 (such as D3 and D4) as the two nodes whose status information should be sent firstly if one broadcast can only carry the status information of the two other nodes. Then the status information of D5 and D2 will be carried in the next status broadcast message.

In step 106, the node generates the status broadcast message according to the current status of its own and all the nodes. The recorded current status information of the other nodes is carried in the status broadcast message to be sent. In particular, the recorded current status information of the other nodes, the identifier and the current status information of the present node as well as the serial number of the present status broadcast message will be sent as the status broadcast message to be sent by the nodes of the wireless network if the status broadcast message to be sent is able to carry the recorded current status information of all the nodes.

In step 107, the node of the wireless network sends the status broadcast message. After that, it will return to step 101 and wait for the next sending time.

In the present embodiment, because the node of the wireless network can automatically and periodically broadcast the status information, each device-node in the smart home system can automatically update its status and each device records the updated status of all the nodes in the wireless smart network such that the user can nearby and rapidly acquire the updated status of each device without needing much time to wait for the feedback so as to improve the user experience.

The second embodiment of the present invention relates to a status updating method for nodes of a wireless network. The second embodiment is further improved on the basis of the first embodiment. The major improvement is in that: in the second embodiment of the present invention, the nodes of the wireless network, after receiving the status information broadcasted by the other nodes and recording the current status information of the other nodes carried in the received status broadcast information, update the recorded current status information of each node on basis of the newly received status broadcast message. The node corresponding to the invalid node status information is marked as the off-line status if there is the invalid node status information in the recorded current status information of each node, wherein the invalid node status information is current status information of a node whose most recent updating time or recording time has a difference from the current time greater than a preset time duration threshold.

For example, after receiving the N1 status broadcast message, D1 should update the status information of D2 to the status information received at the time T1 if the node D1 of the wireless network firstly receives the status information of D2 at the time T1 and the corresponding status broadcast message serial number is N1. After passing the time duration t, D1 receives the status information of D2 again at the time T2 and the corresponding status broadcast message serial number is N2. Then, as for the node D2 in the wireless network, N2 is the newly received status broadcast message relative to N1. After receiving the N2 status broadcast message, D1 should update the status information of D2 to the received status information at the time T2.

As for the judgment whether the nodes of the wireless network are in the off-line status, a time length threshold (such as 100 milliseconds) can be preset. If the difference between the most recent updating time or recording time of each of the recorded nodes and the current time is more than 100 milliseconds, the status information of the nodes will be the invalid node status information and the corresponding node should be marked as the off-line status.

In the present embodiment, the user may timely and actively know the malfunctioning nodes so as to timely deal with the malfunction and further improve the user experience because of considering the existence of the invalid status of the nodes of the wireless network.

In order to describe clearly, the steps of the above-mentioned method are divided. These steps can be combined into one step or also be separated into multiple steps when implementing. As long as they comprise the same logical relationship, they will fall into the protection scope of the present invention. The algorism or procedure, to which the insignificant modifications or the insignificant designs are added or introduced without changing the core design of the algorism or procedure, will still fall into the protection scope of the present invention.

Figure 3:
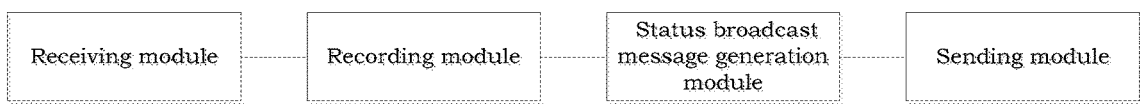
FIG. 3 is a structural diagram of the nodes of the wireless network according to the third embodiment of the present invention.

The third embodiment of the present invention relates to a node of a wireless network, as shown in FIG. 3, which comprises:

a sending module for periodically sending the status broadcast message in the preset cycle, the status broadcast message at least carrying the identifier and the current status information of the present node;

a receiving module for receiving the status broadcast message of the other nodes of the same wireless network;

a recording module for recording the current status information of the other nodes carried in the received status broadcast messages when receiving the status broadcast messages of the other nodes;

a status broadcast message generation module for generating the status broadcast message to be sent currently; the generated status broadcast message carrying the recorded current status information of the other nodes.

It is not difficult to find that the present embodiment is a systematic embodiment corresponding to the first embodiment. The present embodiment can be implemented through the cooperation with the first embodiment. The related technical details proposed in the first embodiment remains effective in the present embodiment. These technical details are omitted so as to reduce the repetition herein. Correspondingly, the related technical details in the present embodiment can also be applied to the first embodiment.

It is worth mentioning that the related modules in the present embodiment are all logic modules. In the practical application, a logic module can be a physical unit, a part of a physical unit, or the combination of many physical units. In addition, in order to emphasize the innovational part of the present invention, the present implementation does not introduce a unit which is not closely related to the technical problem of the invention. However this does not indicate that there are no other units in this implementation.

The fourth embodiment of the present invention relates to the node of the wireless network. The fourth embodiment is further improves on the basis of the third embodiment. The major improvement is in that: in the fourth embodiment of the present invention, it further comprises:

a maintenance module for updating the recorded current status information of each node according to the status broadcast messages newly received by the receiving module;

a judging module for judging, in the recorded current status information of each node, whether there is the status information of the invalid nodes whose most recent updating time or recording has a difference from the current time greater than a preset time duration threshold;

a marking module for marking the node corresponding to the invalid node status information as the off-line status when judging the existence of the status information of the invalid node through the judging module.

Because the second embodiment corresponds to the present embodiment, the present embodiment can be implemented through the cooperation with the second embodiment. The related technical details in the second embodiment remains effective in the present embodiment, and the technical effect achieved in the second embodiment can also be achieved in the present invention. These details will be omitted to reduce the repetition herein. Correspondingly, the related technical details in the present embodiment can also be applied to the second embodiment.

It will be apparent to those of ordinary skill in the art that the above-mentioned embodiments are the particular embodiments for realizing the present invention, whereas, in the practical applications, the embodiments can be changed in the form and detail without departing from the spirit and scope of the present invention.

The invention claimed is:

1. A status updating method for nodes of a wireless network, comprising:
   each node in the wireless network periodically sending status broadcast messages according to a preset period, the status broadcast messages at least carrying an identifier and current status information of the node;
   nodes that receive the status broadcast messages recording current status information of the other nodes carried in the received status broadcast messages;
   wherein the recorded current status information of the other nodes is carried in the broadcast status broadcast message if the each node in the wireless network has received the status broadcast messages of the other nodes when the node needs to broadcast the status broadcast messages, and
   wherein, in the step or carrying the recorded current status information of the order nodes in the boradcasted status broadcast message, the method comprises following sub-steps:
   judging whether the status broadcast message to be broadcasted currently is able to carry the recorded current status information of all the nodes;
   selecting according to a preset strategy, the recorded current status information of some nodes as the current status information of the other nodes carried in the status broadcast messages to be broadcasted currently if the judging result is no.

2. The status updating method for nodes of a wireless network according to claim 1, wherein a serial number of the current status broadcast message is also carried in the status broadcast messages.

3. The status updating method for nodes of a wireless network according to claim 1, wherein the status broadcast messages are signaling messages below 10 bytes.

4. The status updating method for nodes of a wireless network according to claim 1, wherein the preset strategy is to select the recorded current status information of the nodes according to recording time of the current status information of the nodes and in a time order from old to new.

5. The status updating method for nodes of a wireless network according to claim 1, wherein, after the step that the nodes that receive the status broadcast messages records the current status information of the other nodes carried in the received status broadcast message, the method further comprises:
   updating the recorded current status information of each node according to the newly received status broadcast messages;
   marking a node corresponding to invalid node status information as the off-line status if the invalid node status information exists in the recorded current status information of each node;
   wherein the invalid node status information is current status information of a node whose most recent updating time or recording time has a difference from the current time greater than a preset time duration threshold.

6. The status updating method for nodes of a wireless network according to claim 1, wherein the nodes are the smart home devices, and the wireless network comprises any of the following types of smart home devices or combination thereof: a sensor, and a smart light.

7. A node of a wireless network, comprising:
   a sending module adapted to periodically send the status broadcast messages according to a preset period, the status broadcast message carrying at least an identifier and current status information of the node;
   a receiving module adapted to receive the status broadcast messages of the other nodes of the same wireless network;
   a recording module adapted to record, when receiving the status broadcast messages of the other nodes, the current status information of the other nodes carried in the received status broadcast messages;
   a status broadcast message generation module adapted to generate the status broadcast message to be sent currently, the generated status broadcast message also carrying the recorded current status information of the other nodes, and wherein the status broadcast message generation module is further adapted to:

judge whether the status broadcast message to be broadcasted currently is able to carry the recorded current status information of all the nodes;

select, according to a preset strategy, the recorded current status information of some nodes as the current status information of the other nodes carried in the status broadcast messages to be broadcasted currently if the judging result is no.

8. The node of a wireless network according to claim 7, wherein a serial number of the current status broadcast message is also carried in the status broadcast message.

9. The node of a wireless network according to claim 7, further comprising:

a maintenance module adapted to update the recorded current status information of each node according to status broadcast messages newly received by the receiving module;

a judging module adapted to judge, in the recorded current status information of each node, whether there is status information of an invalid node whose most recent updating time or recording time has a difference from the current time greater than a preset time duration threshold; and a marking module adapted to mark a node corresponding to the invalid node status information as the off-line status when the judging module judges that the status information of the invalid node exists.

* * * * *